United States Patent
Liu et al.

(10) Patent No.: US 10,520,947 B2
(45) Date of Patent: Dec. 31, 2019

(54) MACHINE LEARNING FOR EVENT DETECTION AND CLASSIFICATION IN AUTONOMOUS VEHICLES

(71) Applicant: UATC, LLC, San Francisco, CA (US)

(72) Inventors: Chenggang Liu, Pittsburgh, PA (US); John Evan Bares, Gibsonia, PA (US)

(73) Assignee: UATC, LLC, San Francisco, CA (US)

( * ) Notice: Subject to any disclaimer, the term of this patent is extended or adjusted under 35 U.S.C. 154(b) by 134 days.

(21) Appl. No.: 15/469,981

(22) Filed: Mar. 27, 2017

(65) Prior Publication Data
US 2018/0275667 A1    Sep. 27, 2018

(51) Int. Cl.
| | | |
|---|---|---|
| G05D 1/02 | (2006.01) | |
| B60W 50/029 | (2012.01) | |
| B60W 30/095 | (2012.01) | |
| G01C 21/26 | (2006.01) | |

(52) U.S. Cl.
CPC ......... *G05D 1/0221* (2013.01); *B60W 30/095* (2013.01); *B60W 50/029* (2013.01); *G01C 21/26* (2013.01); *B60W 2530/14* (2013.01); *G05D 2201/0213* (2013.01)

(58) Field of Classification Search
CPC . G05D 1/0221; B60R 21/013; B60W 50/029; B60W 2530/14; G07C 5/08
USPC .................................................. 701/27, 32.2
See application file for complete search history.

(56) References Cited

U.S. PATENT DOCUMENTS

| | | | | |
|---|---|---|---|---|
| 5,667,244 | A * | 9/1997 | Ito | B60R 21/0132 |
| | | | | 180/282 |
| 9,056,616 | B1 * | 6/2015 | Fields | B60W 50/14 |
| 9,392,431 | B2 * | 7/2016 | Barfield, Jr. | H04W 4/046 |
| 2014/0002277 | A1 * | 1/2014 | Fulger | G01C 21/3415 |
| | | | | 340/905 |
| 2017/0050599 | A1 * | 2/2017 | Gilbert | B60R 21/01332 |
| 2018/0118219 | A1 * | 5/2018 | Hiei | B60W 40/09 |

* cited by examiner

*Primary Examiner* — Isaac G Smith
(74) *Attorney, Agent, or Firm* — Dority & Manning, PA (57) ABSTRACT

The present disclosure provides systems and methods for automatic event detection and classification for autonomous vehicles. One example method includes obtaining, by one or more computing devices, vehicle data descriptive of vehicle conditions associated with an autonomous vehicle during an autonomous driving session. The method includes extracting, by the one or more computing devices, a plurality of features from the vehicle data. The method includes determining, by the one or more computing devices using a machine-learned classifier, a classification for each of one or more candidate events based at least in part on one or more of the plurality of features that are respectively associated with the one or more candidate events. The method includes associating, by the one or more computing devices, the classification determined for each of the one or more candidate events with the vehicle data.

17 Claims, 5 Drawing Sheets

FIG. 6

MACHINE LEARNING FOR EVENT DETECTION AND CLASSIFICATION IN AUTONOMOUS VEHICLES

FIELD

The present disclosure relates generally to autonomous vehicles. More particularly, the present disclosure relates to automatic event detection and classification for autonomous vehicles through the use of machine learned classifier models and to training techniques for such classifier models.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to detect uncomfortable driving events performed by autonomous vehicles. The method includes obtaining, by one or more computing devices, vehicle data descriptive of vehicle conditions associated with an autonomous vehicle during an autonomous driving session. The method includes extracting, by the one or more computing devices, a plurality of features from the vehicle data. The method includes determining, by the one or more computing devices using a machine-learned classifier, a classification for each of one or more candidate events based at least in part on one or more of the plurality of features that are respectively associated with the one or more candidate events. The method includes associating, by the one or more computing devices, the classification determined for each of the one or more candidate events with the vehicle data.

Another example aspect of the present disclosure is directed to a computer system. The computer system includes one or more processors. The computer system includes one or more tangible, non-transitory, computer readable media that collectively store at least one vehicle data log that was collected during a previous autonomous vehicle driving session. The vehicle data log is descriptive of vehicle conditions associated with an autonomous vehicle during the previous autonomous vehicle driving session. The vehicle data log is annotated with a plurality of event labels respectively at a plurality of times. The computer readable media collectively store instructions that, when executed by the one or more processors, cause the computer system to: extract, for each of the plurality of times, one or more features from the vehicle data log; associate each event label with the one or more features extracted from the vehicle data log for the corresponding time; and train a classifier model to perform event classification based at least in part on the plurality of event labels and the one or more features respectively associated therewith.

Another example aspect of the present disclosure is directed to a computer system. The computer system includes: one or more processors; a machine-learned classifier model; and one or more tangible, non-transitory, computer-readable media that store instructions that, when executed by the one or more processors, cause the one or more processors perform operations. The operations include obtaining vehicle data descriptive of vehicle conditions associated with an autonomous vehicle during a driving session. The operations include extracting a plurality of features from the vehicle data. The operations include identifying a plurality of candidate events. The operations include inputting, for each of the plurality of candidate events, the plurality of features into the machine-learned classifier model. The operations include receiving, for each of the plurality of candidate events, a classification for the candidate event as an output of the machine-learned classifier model. The operations include associating the classification provided for each of the one or more candidate events with the vehicle data.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Generally, the present disclosure is directed to systems and methods for automatic event detection and classification for autonomous vehicles. In particular, the systems and methods of the present disclosure can include or otherwise leverage one or more machine learned classifier models that can perform event classification on the basis of various features extracted from vehicle data, such as, for example, vehicle sensor data. For example, the features can be extracted by performing a continuous wavelet transform or other feature extraction technique on the vehicle data. According to another aspect of the present disclosure, existing vehicle data logs that include event labels manually recorded by a human passenger can be used to train the machine learned classifier model. For example, the classifier model can be trained using an objective function that describes a difference between predictions made by the classifier model on the existing vehicle data log and the event labels provided by the human passenger and associated with the vehicle data log.

More particularly, one aspect of developing, operating, and refining autonomous vehicle technology is continuously testing the performance of autonomous vehicles. As an example, one metric by which the quality of motion control performed by an autonomous vehicle can be measured is the number and type of special events that occur during an autonomous driving session performed by the autonomous vehicle. As examples, events can include undesirable driving events such as high acceleration, high deceleration, juke motions, jerk motions, weaving motions, or other events that reduce the quality of ride experienced by a human passenger of the autonomous vehicle (e.g., cause the ride to be uncomfortable to a human passenger).

Thus, the number and type of events that occur during an autonomous driving session performed by an autonomous vehicle can provide an indication of the quality of motion control performed by the autonomous vehicle. As such, data that describes such events can be useful for testing, scoring, and/or refining the operation of the autonomous vehicle.

In addition, detection and classification of events can also be useful for detecting, marking, and/or triaging instances of poor performance by various components or systems of the autonomous vehicle (e.g., systems responsible for perceiving the surrounding environment and/or determining a motion plan through the surrounding environment). For example, a detected event of a certain type may assist a triage team or system in routing an identified instance of autonomous vehicle failure to the appropriate development team for analysis and resolution.

One potential technique by which the number and type of events that occur during a driving session performed by an autonomous vehicle can be collected is to have a human co-pilot or passenger ride in the autonomous vehicle and make a record of when particular events occur. For example, if the autonomous vehicle performs an uncomfortably high deceleration at a particular time, the human passenger might make a record (e.g., an electronic record) that a high deceleration event occurred at such time. The humanly-generated record can be attached to any data collected by the autonomous vehicle at such time (e.g., vehicle data).

However, the above technique that relies solely upon human passengers to detect and classify events has a number of drawbacks. As examples, the use of human passengers can cause such technique to be relatively high cost and challenging to scale. In addition, use of different human passengers relies on different subjective senses of when events occur, rather than a uniform definition, which can result in poor and/or inconsistent detection and classification of events. Likewise, using a human passenger to create and complete event records can cause a delay between when the event occurred and when the record was created, leading to inaccurate timestamps for the event records. Finally, the above technique that relies solely upon human passengers to detect and classify events is not extendable to detecting and classifying events within simulated driving sessions.

Another potential technique by which the number and type of events that occur during a driving session performed by an autonomous vehicle can be collected is to apply various predefined metrics to vehicle data collected during the driving session. For example, a predefined deceleration threshold or other metric can be applied to identify events of high deceleration. However, metrics may not exist for certain events (e.g., juke or weave). In such instances, a new metric will need to be designed, tested, and refined for each type of event. Further, even for events for which predefined metrics have been established, such metrics may not easily transfer from one vehicle type to another or from one data type to another. For example, a metric for identifying high deceleration in a sedan may not be useful for identifying high deceleration in a sports utility vehicle. Finally, even predefined metrics can require tuning of thresholds or other design parameters to ensure that they are consistent with humans' subjective feelings.

In view of the above, the present disclosure provides systems and methods for automatic event detection and classification for autonomous vehicles. In particular, the systems and methods of the present disclosure can include or otherwise leverage one or more machine learned classifier models that can perform event classification on the basis of various features extracted from vehicle data, such as, for example, vehicle sensor data. For example, the features can be extracted by performing a continuous wavelet transform or other feature extraction technique on the vehicle data. According to another aspect of the present disclosure, existing vehicle data logs that include event labels recorded by a human passenger (e.g., as described above) can be used to train the machine learned classifier model. For example, the classifier model can be trained using an objective function that describes a difference between predictions made by the classifier model on the existing vehicle data log and the event labels associated with the vehicle data log.

Once the classifier model has been trained, the systems and methods of the present disclosure can assist in evaluating an autonomous vehicle motion control system completely based on sensor feedback and/or other vehicle data, thereby eliminating the need for human passengers to ride along and manually record event occurrences. In addition, the systems and methods of the present disclosure can provide more consistent and accurate results than human co-pilots and, further, can be applied to both real world vehicle data and simulated vehicle data. As such, the systems and methods of the present disclosure can be applied in a number of scenarios, including, as examples: detecting and classifying events in vehicle data logs from previously performed autonomous driving sessions (e.g., for use in triaging vehicle failures that occurred during the autonomous driving sessions); detecting and classifying events from vehicle data in real-time (e.g., for real-time ride quality scoring or other real-time feedback during vehicle operation); detecting and classifying events from simulated vehicle data (e.g., as a portion of a motion planning process or as a portion of a development process); and/or other scenarios which will be discussed in more detail below.

More particularly, the systems and methods of the present disclosure can perform automatic event detection and classification for an autonomous vehicle based on vehicle data associated with the autonomous vehicle. For example, the vehicle data can be descriptive of vehicle conditions associated with an autonomous vehicle during an autonomous driving session. In some implementations, the vehicle data can include data collected by or otherwise received from various sensors included in the autonomous vehicle. As examples, the vehicle data can include data descriptive of a speed (also referred to as velocity) and/or data descriptive of a steering angle of the autonomous vehicle. As another example, additional vehicle data can be obtained or generated that is descriptive of a lateral acceleration of the autonomous vehicle. For example, in some implementations, lateral acceleration can be a function of the speed of the vehicle and the steering angle of the vehicle. Thus, in some implementations, lateral acceleration data can be generated from speed data and steering angle data.

As further examples, the vehicle data can include various types of data descriptive of vehicle conditions, including, for example: light detection and ranging data; radio detection and ranging data; imagery collected by one or more cameras onboard the autonomous vehicle; accelerometer data; positioning system data; gyroscope data; throttle position data; engine or crankshaft torque data; exhaust oxygen data; engine air flow data; engine RPM data; vehicle control data associated with a vehicle controller; and/or any other form of vehicle data associated with the vehicle (e.g., collected or produced by sensors onboard the vehicle). Thus, the vehicle data can include a number of discrete, different types of data which can be referred to in some instances as data channels (e.g., a speed data channel versus a steering angle data channel). As indicated above, the systems and methods of the present disclosure can perform event detection and classification based on such vehicle data.

In some implementations of the present disclosure, the vehicle data can include vehicle data logs from completed driving sessions. For example, an autonomous vehicle or associated computing system can collect and store vehicle data as the autonomous vehicle executes a driving session. After the session has been completed, a log of the vehicle data can be transferred to a computing system that performs event detection and classification on the log of the vehicle data according to the techniques described herein. Information descriptive of the detected events can be associated with the vehicle data log. For example, a record of an event detected as having occurred at a particular timestamp can be added to the vehicle data log. Thereafter, the vehicle data log that includes the automatically provided event records can be used to score or otherwise analyze the performance of the autonomous vehicle during the driving session. As an example, a triage team or system can use the vehicle data log and newly generated event records to identify vehicle "failures" and triage such failures to the appropriate development team for investigation and resolution.

As another example, in some implementations of the present disclosure, the vehicle data can be received and analyzed in real-time as the autonomous vehicle operates. For example, in some implementations, the event detection and classification systems of the present disclosure can be located physically onboard the autonomous vehicle and can receive the vehicle data and detect and classify events in real-time. For example, a small embedded computing system can include and implement the event detection and classification systems of the present disclosure. Real-time event detection and classification can be useful for real-time ride quality scoring or other real-time feedback during vehicle operation.

As yet another example, in some implementations, the vehicle data can include simulated vehicle data. As an example, a motion planner or other system included in the autonomous vehicle can generate simulated vehicle data that corresponds to a simulation of a candidate motion plan. Simulated events can be detected and classified on the basis of the simulated vehicle data. The candidate motion plan can be scored based at least in part on the detected simulated events. As an example, detected simulated events of high deceleration can increase a cost associated with the candidate motion plan, thereby providing incentive for the motion planner to select a motion plan that includes fewer undesirable driving events. Simulated vehicle data can also be generated and analyzed in the context of offline development activities. Thus, in various implementations, the vehicle data can be logged data, real-time data, simulated vehicle data, or other forms of vehicle data.

Having obtained the vehicle data, in some implementations, the systems of the present disclosure can include a data preprocessor that preprocesses the vehicle data to prepare it for event analysis. As an example, in some implementations, the data preprocessor can process the raw vehicle data (e.g., raw sensor data) to determine a state of the vehicle at a given time. For example, the state of the vehicle at a given time can include information describing one or more of the following parameters for the vehicle: timestamp; speed; steering angle; longitudinal acceleration; geographic location; and/or other parameters. In some implementations, preprocessing the vehicle data can include applying one or more filters to the vehicle data. For example, the applied filters can include an average filter, a median filter, and/or a low pass filter. Applying filters in such fashion can smooth the vehicle data to reduce noise. In some implementations, the vehicle data can be preprocessed by the autonomous vehicle in real-time prior to storage in a vehicle data log. In some implementations, the vehicle data is not preprocessed.

According to another aspect of the present disclosure, the systems of the present disclosure can include a feature extractor that extracts a plurality of features from the vehicle data (e.g., the preprocessed vehicle data). In some implementations, the feature extractor can perform even sampling on the vehicle data by sampling the vehicle data at evenly spaced time points. In other implementations, sampling of the vehicle data may be unevenly spaced. In yet further implementations, the feature extractor can continuously or near-continuously sample the vehicle data. In some implementations, each sample of the vehicle data can include a window of data around a particular sampling time.

Regardless, for each instance of sampling of the vehicle data, the feature extractor can extract one or more features from the vehicle data. As examples, the extracted features can include speed feature(s), steering angle feature(s), lateral acceleration feature(s), or other types of features. Generally, the features can be of any type that is useful for detecting and classifying events.

In particular, in some implementations, the feature extractor can perform a feature extraction technique on the vehicle data to extract the plurality of features. Example feature extraction techniques that can be performed include the continuous wavelet transform technique, the short-term Fourier transform, and/or other time-frequency analysis techniques. When performing the continuous wavelet transform technique, one or more of various wavelets can be used including, as examples: the Haar wavelet; the Daubechies wavelets; the Biorthogonal wavelets; the BD wavelet; the Coiflets wavelets; the Symlets wavelets; the Morlet wavelet; the Mexican Hat wavelet; the Meyer wavelet; and/or other wavelets. In particular, performing continuous wavelet transform with the Mexican Hat wavelet and/or the BD wavelet can be particularly beneficial for extracting features useful for detection of events of high acceleration, high deceleration, and/or juke.

Thus, as an example, the feature extractor can sample the vehicle data (e.g., speed data, steering angle data, lateral acceleration data, and/or other vehicle data channels or representations) and perform continuous wavelet transform (or other feature extraction techniques) on each channel of the sampled data. In particular, in some implementations, performing continuous wavelet transform (or other feature extraction techniques) on the sampled data can include determining a plurality of scale components for each channel of vehicle data. For example, a selected wavelet (e.g., the Mexican Hat wavelet) can be scaled according to a number of scale values. For example, in some implementations, approximately one hundred scale values can be used. Thus, to provide a particular example for the purpose of illustration, the feature extractor can perform continuous wavelet transform on sampled speed data at one hundred scale values of the Mexican Hat wavelet, which can result in one hundred scale components for the speed data per instance of sampling. In some implementations, the scale components can directly be used as features for detecting and classifying events.

In addition, in some implementations, the feature extractor can compute, for each channel of vehicle data, a set of statistics that describe the plurality of scale components for each sample of such channel of vehicle data. As examples, the computed statistics for each channel of vehicle data can include one or more of: a mean of the plurality of scale components, a standard deviation of the plurality of scale components, a maximum of the plurality of scale components, a minimum of the plurality of scale components, and a moment of the plurality of scale components. For example, a moment of a scale component can correspond to the scale value multiplied by the magnitude of such scale component or, in other terms, can correspond to the frequency multiplied by the wavelet amplitude. Thus, to continue the particular example provided above, the feature extractor can compute a set of statistics for the one hundred scale components for the speed data per instance of sampling. In addition, in some implementations, statistics can be computed over an extended time window (e.g., one minute) for use in jumpy detection. In some implementations, the computed statistics can be used as features for detecting and classifying events in addition or alternatively to use of the scale components directly as features.

In some implementations, the features extracted for each time sample of the vehicle data (e.g., scale components and/or statistics for scale components) can be input into the classifier model to receive a classification for such sample of vehicle data. For example, the classifier can receive the features extracted from some or all of the vehicle data channels for a given time sample and, in response, provide a classification based on the received features for such time sample. The classification can be a binary classification or a multinomial classification.

In other implementations, the systems of the present disclosure can include a candidate event detector that analyzes the features extracted for each time sample of the vehicle data and identifies whether such time sample includes one or more candidate events. Thus, in some implementations, only features that have been identified as corresponding to one or more candidate events are input into the classifier model, which may, in some instances, enhance system efficiency.

In some implementations, the candidate event detector can identify candidate events based on the extracted features. For example, in some implementations, the candidate event detector can identify one or more relative peaks associated with the plurality of scale components determined for a particular vehicle data channel. As one example, a relative peak can be identified at each instance in which the absolute value of a scale component is greater than the mean of the absolute value of such scale component. Each identified peak can be regarded as or otherwise correspond to a candidate event.

As described above, the features extracted for a particular time sample of the vehicle data (e.g., a time sample identified as corresponding to one or more candidate events) can be input into the classifier model to receive a classification for such sample of vehicle data (e.g., for each identified candidate event). For example, the classifier can receive the features extracted from some or all of the vehicle data channels for a given time sample and, in response, provide a classification based on the received features for such time sample or corresponding candidate event(s). In some implementations, vehicle data can also be provided as inputs to the classifier model in addition to the extracted features. The classification can be a binary classification (e.g., identify a single classification) or a multinomial classification (e.g., provide a relative score or probability for each available classification). Example event classifications include: a high deceleration classification, a high acceleration classification, a juke classification, a jerk classification, a weaving classification, a "no event" classification, an "other" classification, and/or any other types of classification that are desired to be detected. In some implementations, the classifier model can further perform jumpy detection in which a large number of events within a time window (e.g., one minute) are detected.

As examples, the machine-learned model can be or include one or more of a logistic regression classifier, a support vector machine, one or more decision trees, a neural network, and/or other types of models including non-linear models. Neural networks can include deep neural networks, feed-forward neural networks, recurrent neural networks (e.g., long short-term memory recurrent neural networks), convolutional neural networks, or combinations thereof.

According to another aspect of the present disclosure, existing vehicle data logs that include event labels recorded by a human passenger can be used to train the machine learned classifier model. In particular, a human co-pilot or passenger can ride in an autonomous vehicle and make a record of when particular events occur. At the same time, the autonomous vehicle can record or otherwise store its collected vehicle data. The humanly-generated events records can be attached to the data collected by the autonomous vehicle at such time. Thus, although generally inefficient for the reasons discussed above, use of a human passenger to provide manual labels can result in a corpus of vehicle data logs that include event labels that are generally aligned in time with vehicle data that reflects such events. According to an aspect of the present disclosure, such corpus of vehicle data logs with event labels can be used to train the machine learned classifier model.

However, using a human passenger to create and complete event records can, in some instances, cause a delay between when the event occurred and when the record was created, thereby leading to at least some of the event records having a slight delay in their timestamp relative to when the event occurred. To remedy this issue, in some implementations, the systems of the present disclosure can apply or re-apply each event label to any potentially referenced events that occurred within some time window prior to the timestamp of such event label. Thus, for each event label included in the vehicle data log, the computing system can identify a plurality of potentially referenced events within a time window prior to the particular time associated with the event label and associate the event label with each of the plurality of potentially referenced events. To provide an example, for a particular high acceleration event label, all potential events of high acceleration (e.g., instances in which acceleration is greater than a threshold value) within a sixty second window prior to the event label can be labeled as positives for high acceleration events. In other implementations, candidate events within the time window can be identified as described above (e.g., through identification of relative peaks in scale components), and the event label can be applied to each of such candidate events. Other techniques can be used to apply the manual event labels to their corresponding features as well.

In some implementations, to generate the training data from the vehicle data logs and manual labels, the systems and methods of the present disclosure can extract, for each time at which an event label has been applied to the vehicle data, one or more features from the vehicle data log. For example, the feature extraction process described above can be applied at each instance in which a label has been applied to the vehicle data. The event label can then be associated with the one or more features extracted from the vehicle data log for the corresponding time or vice versa. Thus, as a result, a training set can be generated that includes a plurality of sets of features, where each set of features is labeled with a particular event label (e.g., "high acceleration").

The classification model can be trained using such training data. In particular, in some implementations, a training computing system can, for each pair of extracted features and corresponding event label, input the extracted features into the classifier model; receive at least one classification as an output of the classifier model; and determine an objective function that describes a difference between the at least one classification and the event label that corresponds to the input features. The training system can train the classifier model based at least in part on the objective function. As one example, in some implementations, the objective function can be backpropagated through the classifier model to train the classifier model. In such fashion, the classifier model can be trained to provide a correct event classification based on the receipt of features extracted from vehicle data.

Once the classifier model has been trained, the systems and methods of the present disclosure can assist in evaluating an autonomous vehicle motion control system completely based on sensor feedback and/or other vehicle data, thereby eliminating the need for human passengers to ride along and manually record event occurrences. Thus, as one technical benefit, the machine learning-based systems of the present disclosure can greatly reduce the cost associated with evaluating and testing autonomous vehicle ride quality, as human passengers are not required. In addition, the machine learning-based systems of the present disclosure can easily be scaled to thousands of autonomous vehicles, which is in contrast to the inability to directly scale human passengers for ride quality analysis and event detection.

As another technical benefit, the systems and methods of the present disclosure can provide more consistent and accurate results than human co-pilots. In particular, instead of relying on inconsistent and subjective standards of what constitutes a particular event to different human evaluators, a single model or set of models can be used across all instances of ride evaluation to perform consistent event detection and classification.

As a further technical benefit, the systems and methods of the present disclosure can be applied to both real world vehicle data and simulated vehicle data. In contrast, human evaluators cannot evaluate simulated vehicle data to perform event detection. As significant amounts of autonomous vehicle testing and development can be performed within a simulated space, the ability to perform event detection and classification on simulated vehicle data enables enhanced techniques for technological development.

Furthermore, in instances in which the event detection and classification systems of the present disclosure are included in a motion planning system of an autonomous vehicle, scoring of candidate motion plans based on detected events can result in enacted motion plans that include fewer undesirable events, thereby enhancing ride quality, passenger comfort, and general vehicle performance.

In addition, although the present disclosure has been discussed primarily with reference to detecting and classifying events based on vehicle data associated with an autonomous vehicle, the systems and methods described herein can also be applied to detect and classify events based on vehicle data associated with humanly-operated vehicles. For example, real-time or post-session event detection and classification can be used to score or analyze driving performance for the purposes of driver instruction, license testing, insurance coverage compliance/valuation, or other applications. Real-time event detection and classification and corresponding feedback can be useful for real-time instruction of a driver (e.g., notifying driver when uncomfortable driving events are performed).

With reference now to the Figures, example embodiments of the present disclosure will be discussed in further detail.

Example Devices and Systems

Figure 1:
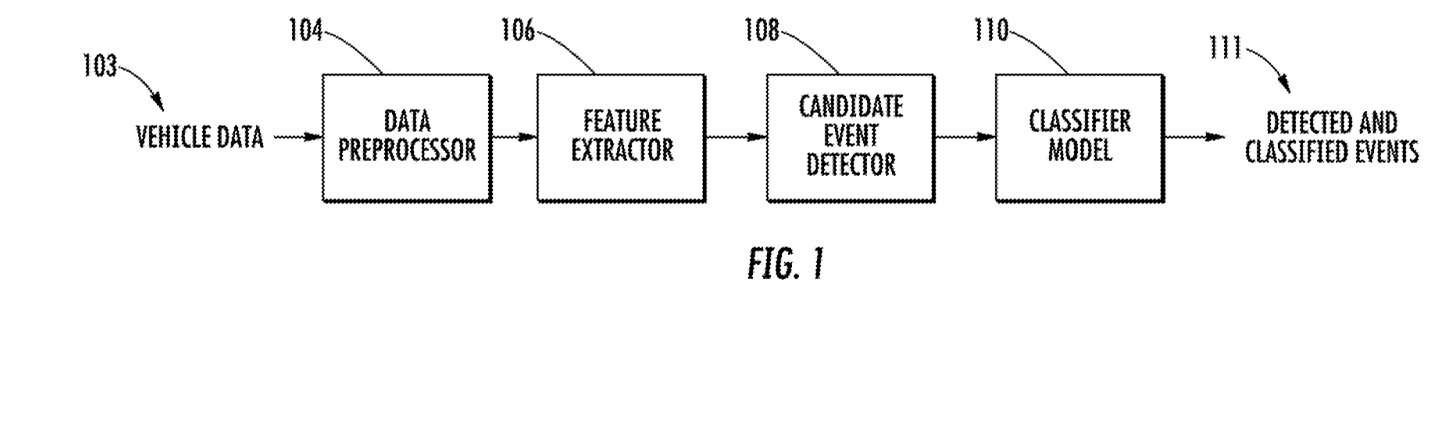
FIG. 1 depicts a block diagram of an example processing pipeline for event detection and classification according to example embodiments of the present disclosure.

FIG. 1 depicts a block diagram of an example processing pipeline for event detection and classification according to example embodiments of the present disclosure. The example processing pipeline of FIG. 1 includes a data preprocessor 104, a feature extractor 106, a candidate event detector 108, and a classifier model 110. The example processing pipeline of FIG. 1 can receive vehicle data 103 associated with the autonomous vehicle and can perform automatic event detection and classification for the autonomous vehicle based on the vehicle data 103.

As one example, the vehicle data 103 can be descriptive of vehicle conditions associated with an autonomous vehicle during an autonomous driving session. In some implementations, the vehicle data 103 can include data collected by or otherwise received from various sensors included in the autonomous vehicle. As examples, the vehicle data 103 can include data descriptive of a speed (also referred to as velocity) and/or data descriptive of a steering angle of the autonomous vehicle. As another example, additional vehicle data 103 can be obtained or generated that is descriptive of a lateral acceleration of the autonomous vehicle. For example, in some implementations, lateral acceleration can be a function of the speed of the vehicle and the steering angle of the vehicle. Thus, in some implementations, lateral acceleration data can be generated from speed data and steering angle data.

As further examples, the vehicle data 103 can include various types of data descriptive of vehicle conditions, including, for example: light detection and ranging data; radio detection and ranging data; imagery collected by one or more cameras onboard the autonomous vehicle; accelerometer data; positioning system data; gyroscope data; throttle position data; engine or crankshaft torque data; exhaust oxygen data; engine air flow data; engine RPM data; vehicle control data associated with a vehicle controller; and/or any other form of vehicle data 103 associated with the vehicle (e.g., collected or produced by sensors onboard the vehicle). Thus, the vehicle data 103 can include a number of discrete, different types of data which can be referred to in some instances as data channels (e.g., a speed data channel versus a steering angle data channel). As indicated above, the systems and methods of the present disclosure can perform event detection and classification based on such vehicle data 103.

In some implementations of the present disclosure, the vehicle data 103 can include vehicle data logs from completed driving sessions. For example, an autonomous vehicle or associated computing system can collect and store vehicle data 103 as the autonomous vehicle executes a driving session. After the session has been completed, a log of the vehicle data 103 can be transferred to a computing system that performs event detection and classification on the log of the vehicle data 103 according to the techniques described herein. Information descriptive of the detected events can be associated with the vehicle data log. For example, a record of an event detected as having occurred at a particular timestamp can be added to the vehicle data log. Thereafter, the vehicle data log that includes the automatically provided event records can be used to score or otherwise analyze the performance of the autonomous vehicle during the driving session. As an example, a triage team or system can use the vehicle data log and newly generated event records to identify vehicle "failures" and triage such failures to the appropriate development team for investigation and resolution.

As another example, in some implementations of the present disclosure, the vehicle data 103 can be received and analyzed in real-time as the autonomous vehicle operates. For example, in some implementations, the event detection and classification systems of the present disclosure can be located physically onboard the autonomous vehicle and can receive the vehicle data 103 and detect and classify events in real-time. For example, a small embedded computing system can include and implement the event detection and classification systems of the present disclosure. Real-time event detection and classification can be useful for real-time ride quality scoring or other real-time feedback during vehicle operation.

As yet another example, in some implementations, the vehicle data 103 can include simulated vehicle data. Example implementations which process simulated vehicle data will be discussed in greater detail below with reference to FIG. 3.

Referring again to FIG. 1, in some implementations, the vehicle data 103 can be provided to a data preprocessor 104 that preprocesses the vehicle data 103 to prepare it for event analysis. As an example, in some implementations, the data preprocessor 104 can process the raw vehicle data (e.g., raw sensor data) to determine a state of the vehicle at a given time. For example, the state of the vehicle at a given time can include information describing one or more of the following parameters for the vehicle: timestamp; speed; steering angle; longitudinal acceleration; geographic location; and/or other parameters. In some implementations, preprocessing the vehicle data 103 can include applying one or more filters to the vehicle data 103. For example, the applied filters can include an average filter, a median filter, and/or a low pass filter. Applying filters in such fashion can smooth the vehicle data 103 to reduce noise. In some implementations, the vehicle data 103 can be preprocessed by the autonomous vehicle in real-time prior to storage in a vehicle data log. In some implementations, the vehicle data 103 is not preprocessed (e.g., the pipeline does not include the data preprocessor 104).

According to another aspect of the present disclosure, the systems of the present disclosure can include a feature extractor 106 that extracts a plurality of features from the vehicle data 103 (e.g., the preprocessed vehicle data 103). In some implementations, the feature extractor 106 can perform even sampling on the vehicle data 103 by sampling the vehicle data 103 at evenly spaced time points. In other implementations, sampling of the vehicle data may be unevenly spaced. In yet further implementations, the feature extractor 106 can continuously or near-continuously sample the vehicle data 103. In some implementations, each sample of the vehicle data 103 can include a window of data around a particular sampling time.

Regardless, for each instance of sampling of the vehicle data 103, the feature extractor 106 can extract one or more features from the vehicle data 103. As examples, the extracted features can include speed feature(s), steering angle feature(s), lateral acceleration feature(s), or other types of features. Generally, the features can be of any type that is useful for detecting and classifying events.

In particular, in some implementations, the feature extractor 106 can perform a feature extraction technique on the vehicle data 103 to extract the plurality of features. Example feature extraction techniques that can be performed include the continuous wavelet transform technique, the short-term Fourier transform, and/or other time-frequency analysis techniques. When performing the continuous wavelet transform technique, one or more of various wavelets can be used including, as examples: the Haar wavelet; the Daubechies wavelets; the Biorthogonal wavelets; the BD wavelet; the Coiflets wavelets; the Symlets wavelets; the Morlet wavelet; the Mexican Hat wavelet; the Meyer wavelet; and/or other wavelets. In particular, performing continuous wavelet transform with the Mexican Hat wavelet and/or the BD wavelet can be particularly beneficial for extracting features useful for detection of events of high acceleration, high deceleration, and/or juke.

Thus, as an example, the feature extractor 106 can sample the vehicle data 103 (e.g., speed data, steering angle data, lateral acceleration data, and/or other vehicle data channels or representations) and perform continuous wavelet transform (or other feature extraction technique(s)) on each channel of the sampled data. In particular, in some implementations, performing continuous wavelet transform (or other feature extraction technique(s)) on the sampled data can include determining a plurality of scale components for each channel of vehicle data 103. For example, a selected wavelet (e.g., the Mexican Hat wavelet) can be scaled according to a number of scale values. For example, in some implementations, approximately one hundred scale values can be used. Thus, to provide a particular example for the purpose of illustration, the feature extractor 106 can perform continuous wavelet transform on sampled speed data at one hundred scale values of the Mexican Hat wavelet, which can result in one hundred scale components for the speed data per instance of sampling. In some implementations, the scale components can directly be used as features for detecting and classifying events.

In addition, in some implementations, the feature extractor 106 can compute, for each channel of vehicle data 103, a set of statistics that describe the plurality of scale components for each sample of such channel of vehicle data 103. As examples, the computed statistics for each channel of vehicle data 103 can include one or more of: a mean of the plurality of scale components, a standard deviation of the plurality of scale components, a maximum of the plurality of scale components, a minimum of the plurality of scale components, and a moment of the plurality of scale components. For example, a moment of a scale component can correspond to the scale value multiplied by the magnitude of such scale component or, in other terms, can correspond to the frequency multiplied by the wavelet amplitude. Thus, to continue the particular example provided above, the feature extractor 106 can compute a set of statistics for the one hundred scale components for the speed data per instance of sampling. In addition, in some implementations, statistics can be computed over an extended time window (e.g., one minute) for use in jumpy detection. In some implementations, the computed statistics can be used as features for detecting and classifying events in addition or alternatively to use of the scale components directly as features.

In some implementations, the features extracted for each time sample of the vehicle data 103 (e.g., scale components and/or statistics for scale components) can be input into the classifier model 110 to receive a classification 111 for such sample of vehicle data 103. For example, the classifier model 110 can receive the features extracted from some or all of the vehicle data channels for a given time sample and, in response, provide a classification 111 based on the received features for such time sample. The classification 111 can be a binary classification or a multinomial classification.

In other implementations, as illustrated in FIG. 1, the processing pipeline includes the candidate event detector 108 that analyzes the features extracted for each time sample of the vehicle data 103 and identifies whether such time sample includes one or more candidate events. Thus, in some implementations, only features that have been identified as corresponding to one or more candidate events are input into the classifier model 110, which may, in some instances, enhance system efficiency.

In some implementations, the candidate event detector 108 can identify candidate events based on the extracted features. For example, in some implementations, the candidate event detector 108 can identify one or more relative peaks associated with the plurality of scale components determined for a particular vehicle data channel. As one example, a relative peak can be identified at each instance in which the absolute value of a scale component is greater than the mean of the absolute value of such scale component. Each identified peak can be regarded as or otherwise correspond to a candidate event.

As described above, the features extracted for a particular time sample of the vehicle data 103 (e.g., a time sample identified as corresponding to one or more candidate events) can be input into the classifier model 110 to receive a classification 111 for such sample of vehicle data 103 (e.g., for each identified candidate event). For example, the classifier model 110 can receive the features extracted from some or all of the vehicle data channels for a given time sample and, in response, provide a classification 111 based on the received features for such time sample or corresponding candidate event(s). In some implementations, vehicle data 103 can also be provided as inputs to the classifier model 110 in addition to the extracted features. The classification 111 can be a binary classification (e.g., identify a single classification) or a multinomial classification (e.g., provide a relative score or probability for each available classification). Example event classifications 111 include: a high deceleration classification, a high acceleration classification, a juke classification, a jerk classification, a weaving classification, a "no event" classification, an "other" classification, and/or any other types of classification that are desired to be detected. In some implementations, the classifier model 110 can further perform jumpy detection in which a large number of events within a time window (e.g., one minute) are detected.

As examples, the machine-learned classifier model 110 can be or include one or more of a logistic regression classifier, a support vector machine, one or more decision trees, a random forest classifier, a neural network, and/or other types of models including non-linear models. Neural networks can include deep neural networks, feed-forward neural networks, recurrent neural networks (e.g., long short-term memory recurrent neural networks), convolutional neural networks, or combinations thereof.

Figure 2:
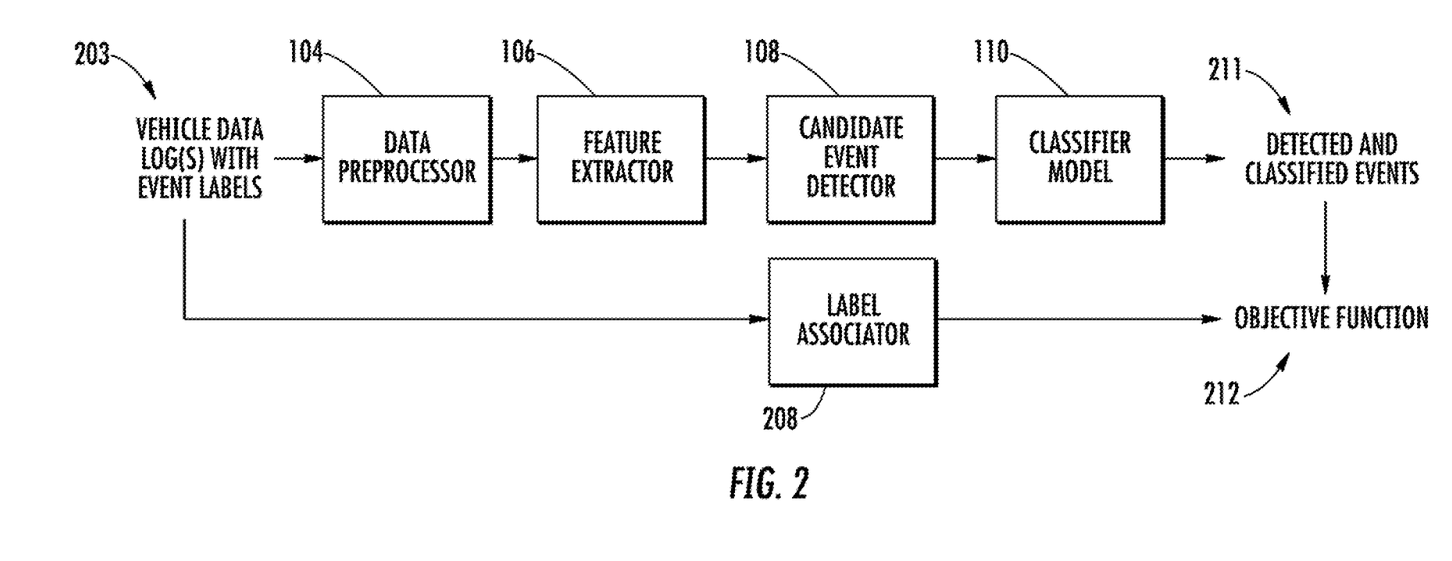
FIG. 2 depicts a block diagram of an example training configuration according to example embodiments of the present disclosure.

FIG. 2 depicts a block diagram of an example training configuration according to example embodiments of the present disclosure. In particular, according to another aspect of the present disclosure, existing vehicle data logs 203 that include event labels recorded by a human passenger can be used to train the machine learned classifier model 110. For example, a human co-pilot or passenger can ride in an autonomous vehicle and make a record of when particular events occur. At the same time, the autonomous vehicle can record or otherwise store its collected vehicle data. The humanly-generated event records can be attached to the data collected by the autonomous vehicle at such time. Thus, although generally inefficient for the reasons discussed above, use of a human passenger to provide manual labels can result in a corpus of vehicle data logs 203 that include event labels that are generally aligned in time with vehicle data that reflects such events. According to an aspect of the present disclosure, such corpus of vehicle data logs 203 with event labels can be used to train the machine learned classifier model 110.

However, using a human passenger to create and complete event records can, in some instances, cause a delay between when the event occurred and when the record was created, thereby leading to at least some of the event records having a slight delay in their timestamp relative to when the event occurred. To remedy this issue, in some implementations, the systems of the present disclosure can include a label associator 208 that applies or re-applies each event label to any potentially referenced events that occurred within some time window prior to the timestamp of such event label. Thus, for each event label included in the vehicle data logs 203, the label associator 208 can identify a plurality of potentially referenced events within a time window prior to the particular time associated with the event label and associate the event label with each of the plurality of potentially referenced events. To provide an example, for a particular high acceleration event label, all potential events of high acceleration (e.g., instances in which acceleration is greater than a threshold value) within a sixty second window prior to the event label can be labeled as positives for high acceleration events. In other implementations, candidate events within the time window can be identified as described above (e.g., through identification of relative peaks in scale components), and the label associator 208 can apply the event label to each of such candidate events. Other techniques can be used to apply the manual event labels to their corresponding features as well.

In some implementations, to generate the training data from the vehicle data logs and manual labels, the feature extractor 106 can extract, for each time at which an event label has been applied to the vehicle data, one or more features from the vehicle data logs 203. For example, the feature extraction process described above can be applied at each instance in which a label has been applied to the vehicle data logs 203. The event label can then be associated with the one or more features extracted from the vehicle data logs 203 for the corresponding time or vice versa. Thus, as a result, a training set can be generated that includes a plurality of sets of features, where each set of features is labeled with a particular event label (e.g., "high acceleration").

The classifier model 110 can be trained using such training data. In particular, in some implementations, a training computing system can, for each pair of extracted features and corresponding event label, input the extracted features into the classifier model 110; receive at least one classification 211 as an output of the classifier model 110; and determine an objective function 212 that describes a difference between the at least one classification 211 and the event label that corresponds to the input features. The training system can train the classifier model 110 based at least in part on the objective function 212. As one example, in some implementations, the objective function 212 can be back-propagated through the classifier model 110 to train the classifier model 110. In such fashion, the classifier model 110 can be trained to provide a correct event classification based on the receipt of features extracted from vehicle data.

Figure 3:
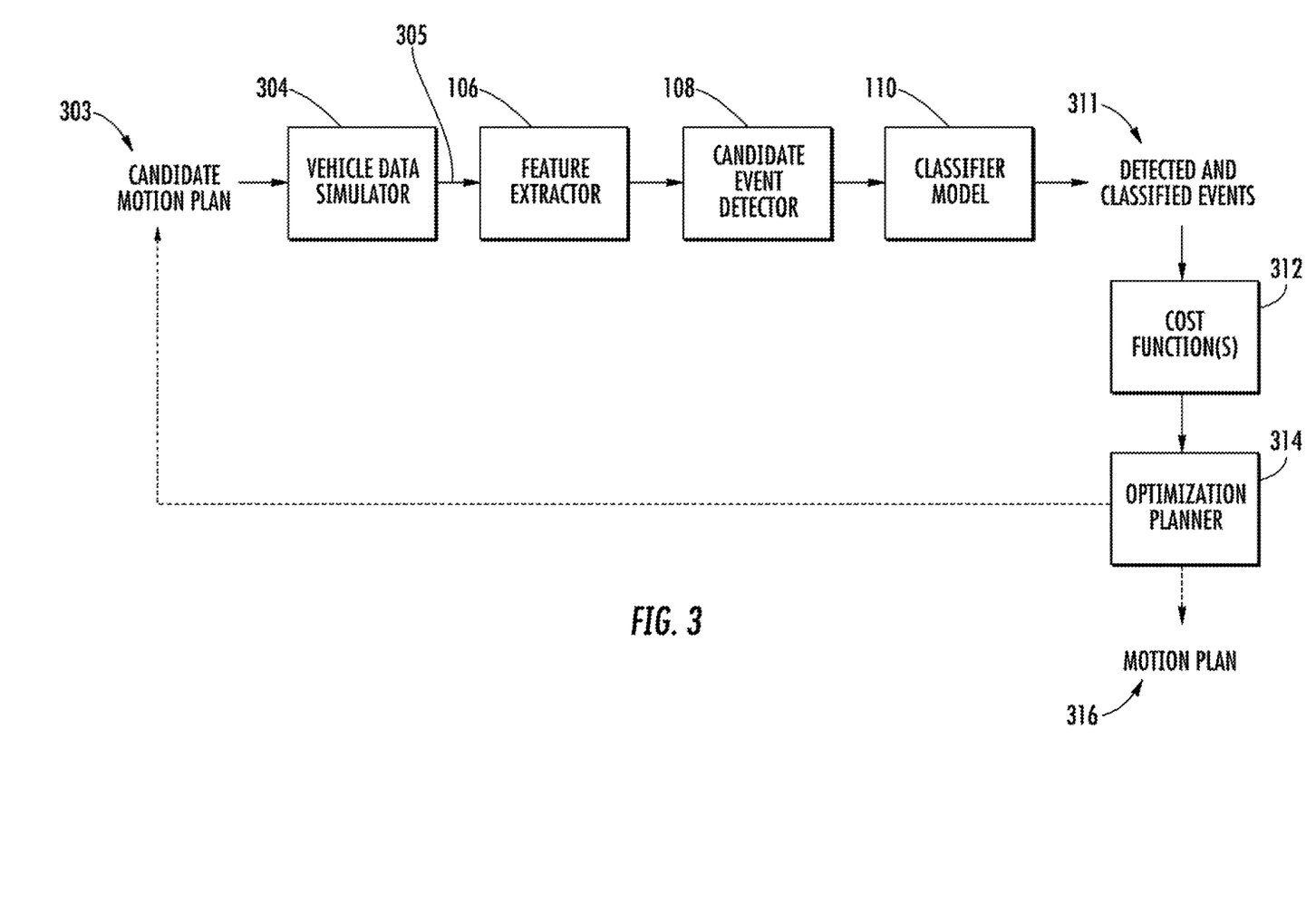
FIG. 3 depicts a block diagram of an example processing pipeline for motion planning according to example embodiments of the present disclosure.

FIG. 3 depicts a block diagram of an example processing pipeline for motion planning according to example embodiments of the present disclosure. In particular, in some implementations, an autonomous vehicle can include a motion planning system that generates a motion plan for the autonomous vehicle. The motion planning system can include an optimization planner 314. In some implementations, the optimization planner 314 can operate iteratively to converge upon an optimal motion plan that minimizes a plurality of cost functions 312. For example, the optimization planner 314 can include an iterative linear quadratic regulator. Thus, the motion planning system can iteratively generate a candidate motion plan 303 and, after a number of iterations to optimize or otherwise improve the candidate motion plan 303, select one of the candidate motion plans 303 as the motion plan 316 for the vehicle.

As such, in some implementations, the motion planning system can use the trained classifier model 110 to assist in scoring or otherwise optimizing the candidate motion plan 316. In particular, having generated a new iteration of a candidate motion plan 303, a vehicle data simulator 304 can generate simulated vehicle data 305 that corresponds to a simulation of the candidate motion plan 303. For example, the simulated vehicle data 305 can include simulated state data that describes the speed, steering angle, lateral acceleration, or other vehicle data parameters for the autonomous vehicle.

Simulated events can be detected and classified on the basis of the simulated vehicle data 305. For example, as illustrated, the simulated vehicle data 305 can be processed by the feature extractor 106, candidate event detector 108, and classifier model 110 as described above with reference to FIG. 1. As a result, the classifier model 110 can output one or more detected and classified events 311 that occurred during the simulation of the candidate motion plan 303.

The candidate motion plan 303 can be scored based at least in part on the detected simulated events 311. In particular, the detected events 311 can be input into one or more cost functions 312 to respectively generate one or more costs (e.g., that contribute to a total cost evaluated for the candidate motion plan 303). As one example, each detected event 311 of high deceleration or other undesirable driving event can increase a cost associated with the candidate motion plan, thereby providing incentive for the optimization planner 314 to select a motion plan 316 that includes fewer undesirable driving events within the detected and classified events 311. Simulated vehicle data 305 can also be generated and analyzed in the context of offline development activities.

Based on the cost functions 312 and their evaluated values, the optimization planner 314 can identify a new candidate motion plan 303 or can select the current candidate motion plan 303 as the motion plan 316 for the autonomous vehicle for the current time period.

Figure 4:
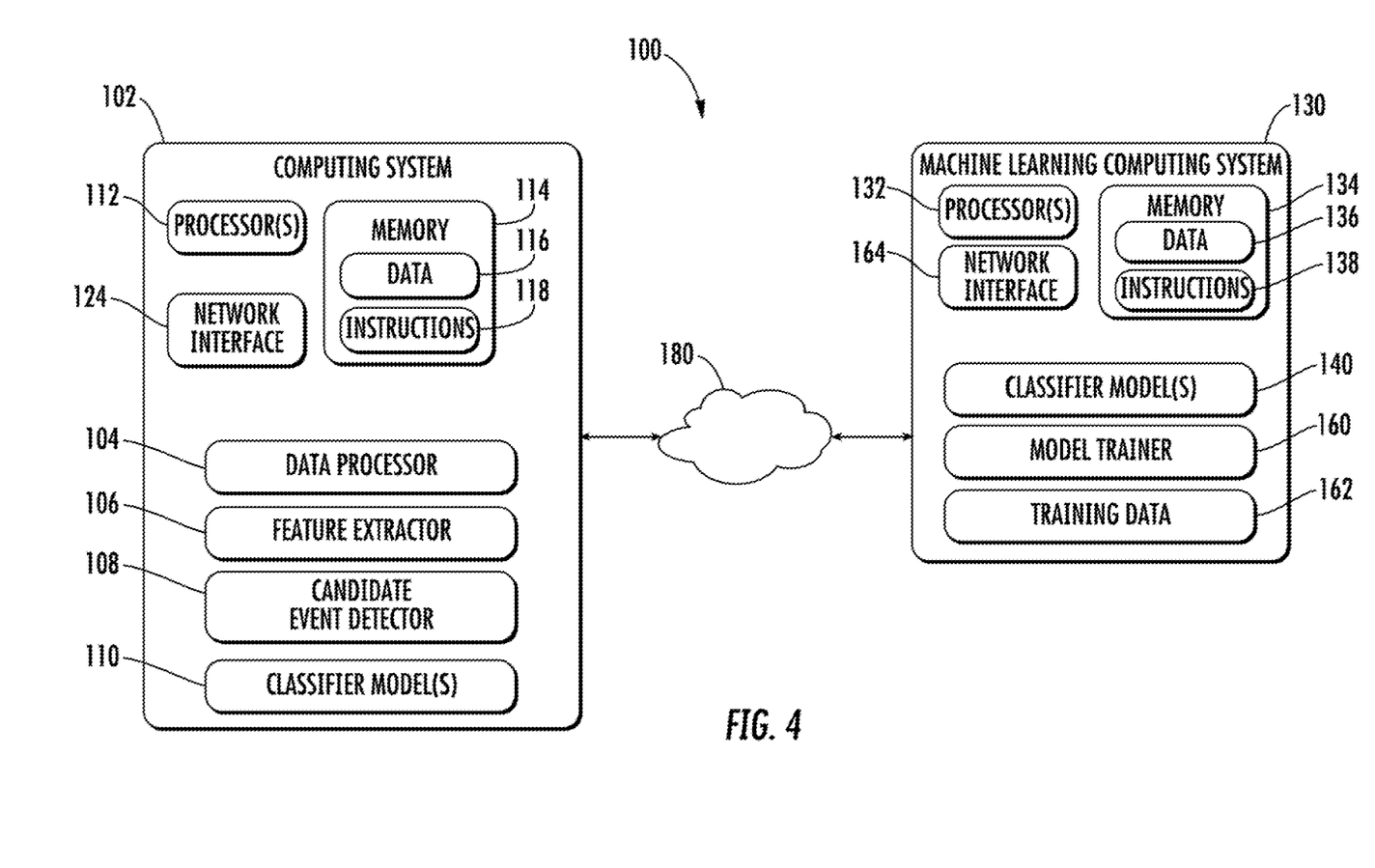
FIG. 4 depicts a block diagram of an example computing system according to example embodiments of the present disclosure.

FIG. 4 depicts a block diagram of an example computing system 100 according to example embodiments of the present disclosure. The example system 100 includes a computing system 102 and a machine learning computing system 130 that are communicatively coupled over a network 180.

In some implementations, the computing system 102 can perform detection, marking, and/or triaging of instances of poor performance by various components or systems of the autonomous vehicle (e.g., systems responsible for perceiving the surrounding environment and/or determining a motion plan through the surrounding environment). For example, a detected event of a certain type may assist a triage team or system in routing an identified instance of autonomous vehicle failure to the appropriate development team for analysis and resolution.

In some implementations, the computing system 102 can be included in an autonomous vehicle. For example, the computing system 102 can be on-board the autonomous vehicle. In other implementations, the computing system 102 is not located on-board the autonomous vehicle. For example, the computing system 102 can operate offline. The computing system 102 can include one or more distinct physical computing devices.

The computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage media, such as RAM, ROM, EEPROM, EPROM, one or more memory devices, flash memory devices, etc., and combinations thereof.

The memory 114 can store information that can be accessed by the one or more processors 112. For instance, the memory 114 (e.g., one or more non-transitory computer-readable storage mediums, memory devices) can store data 116 that can be obtained, received, accessed, written, manipulated, created, and/or stored. In some implementations, the computing system 102 can obtain data from one or more memory device(s) that are remote from the system 102.

The memory 114 can also store computer-readable instructions 118 that can be executed by the one or more processors 112. The instructions 118 can be software written in any suitable programming language or can be implemented in hardware. Additionally, or alternatively, the instructions 118 can be executed in logically and/or virtually separate threads on processor(s) 112.

For example, the memory 114 can store instructions 118 that when executed by the one or more processors 112 cause the one or more processors 112 to perform any of the operations and/or functions described herein.

According to an aspect of the present disclosure, the computing system 102 can store or include one or more machine-learned classifier models 110. For example, the classifier models 110 can be or can otherwise include various machine-learned models such as a logistic regression classifier, a support vector machine, one or more decision trees, a neural network, and/or other types of models including non-linear models. Example neural networks include feed-forward neural networks, recurrent neural networks (e.g., long short-term memory recurrent neural networks), or other forms of neural networks.

In some implementations, the computing system 102 can receive the one or more machine-learned models 110 from the machine learning computing system 130 over network 180 and can store the one or more machine-learned models 110 in the memory 114. The computing system 102 can then use or otherwise implement the one or more machine-learned models 110 (e.g., by processor(s) 112).

The machine learning computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage media, such as RAM, ROM, EEPROM, EPROM, one or more memory devices, flash memory devices, etc., and combinations thereof.

The memory 134 can store information that can be accessed by the one or more processors 132. For instance, the memory 134 (e.g., one or more non-transitory computer-readable storage mediums, memory devices) can store data 136 that can be obtained, received, accessed, written, manipulated, created, and/or stored. In some implementations, the machine learning computing system 130 can obtain data from one or more memory device(s) that are remote from the system 130.

The memory 134 can also store computer-readable instructions 138 that can be executed by the one or more processors 132. The instructions 138 can be software written in any suitable programming language or can be implemented in hardware. Additionally, or alternatively, the instructions 138 can be executed in logically and/or virtually separate threads on processor(s) 132.

For example, the memory 134 can store instructions 138 that when executed by the one or more processors 132 cause the one or more processors 132 to perform any of the operations and/or functions described herein.

In some implementations, the machine learning computing system 130 includes one or more server computing devices. If the machine learning computing system 130 includes multiple server computing devices, such server computing devices can operate according to various computing architectures, including, for example, sequential computing architectures, parallel computing architectures, or some combination thereof.

In addition or alternatively to the model(s) 110 at the computing system 102, the machine learning computing system 130 can include one or more machine-learned classifier models 140. For example, the classifier models 140 can be or can otherwise include various machine-learned models such as a logistic regression classifier, a support vector machine, one or more decision trees, a neural network, and/or other types of models including non-linear models. Example neural networks include feed-forward neural networks, recurrent neural networks (e.g., long short-term memory recurrent neural networks), or other forms of neural networks.

As an example, the machine learning computing system 130 can communicate with the computing system 102 according to a client-server relationship. For example, the machine learning computing system 140 can implement the machine-learned models 140 to provide a web service to the computing system 102. For example, the web service can provide an autonomous vehicle motion planning service and/or an event detection and/or triaging service.

Thus, machine-learned models 110 can located and used at the computing system 102 and/or machine-learned models 140 can be located and used at the machine learning computing system 130.

In some implementations, the machine learning computing system 130 and/or the computing system 102 can train the machine-learned models 110 and/or 140 through use of a model trainer 160. The model trainer 160 can train the machine-learned models 110 and/or 140 using one or more training or learning algorithms. One example training technique is backwards propagation of errors. In some implementations, the model trainer 160 can perform supervised training techniques using a set of labeled training data. In other implementations, the model trainer 160 can perform unsupervised training techniques using a set of unlabeled training data. The model trainer 160 can perform a number of generalization techniques to improve the generalization capability of the models being trained. Generalization techniques include weight decays, dropouts, or other techniques.

In particular, the model trainer 160 can train a machine-learned model 110 and/or 140 based on a set of training data 162. The training data 162 can include, for example, the vehicle data logs 203 with event labels and/or other forms of vehicle data 103. As a further example, an objective function can describe a difference between at least one classification and an event label associated such classification. The model trainer 160 can train the classifier model 110/140 based at least in part on the objective function. For example, the model trainer 160 can backpropagate the objective function through the classifier model to train the classifier model. The model trainer 160 can be implemented in hardware, firmware, and/or software controlling one or more processors.

The computing system 102 can also include a network interface 124 used to communicate with one or more systems or devices, including systems or devices that are remotely located from the computing system 102. The network interface 124 can include any circuits, components, software, etc. for communicating with one or more networks (e.g., 180). In some implementations, the network interface 124 can include, for example, one or more of a communications controller, receiver, transceiver, transmitter, port, conductors, software and/or hardware for communicating data. Similarly, the machine learning computing system 130 can include a network interface 164.

The network(s) 180 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 180 can be accomplished, for instance, via a network interface using any type of protocol, protection scheme, encoding, format, packaging, etc.

Each of the data preprocessor 104, the feature extractor 106, the candidate event detector 108, the label associator 208, the vehicle data simulator 304, the optimization planner 314, and the model trainer 160 includes computer logic utilized to provide desired functionality. Each of the data preprocessor 104, the feature extractor 106, the candidate event detector 108, the label associator 208, the vehicle data simulator 304, the optimization planner 314, and the model trainer 160 can be implemented in hardware, firmware, and/or software controlling a general purpose processor. For example, in some implementations, each of the data preprocessor 104, the feature extractor 106, the candidate event detector 108, the label associator 208, the vehicle data simulator 304, the optimization planner 314, and the model trainer 160 includes program files stored on a storage device, loaded into a memory and executed by one or more processors. In other implementations, each of the data preprocessor 104, the feature extractor 106, the candidate event detector 108, the label associator 208, the vehicle data simulator 304, the optimization planner 314, and the model trainer 160 includes one or more sets of computer-executable instructions that are stored in a tangible computer-readable storage medium such as RAM hard disk or optical or magnetic media.

FIG. 4 illustrates one example computing system 100 that can be used to implement the present disclosure. Other computing systems can be used as well. For example, in some implementations, the computing system 102 can include the model trainer 160 and the training dataset 162. In such implementations, the machine-learned models 110 can be both trained and used locally at the computing system 102. As another example, in some implementations, the computing system 102 is not connected to other computing systems.

In addition, components illustrated and/or discussed as being included in one of the computing systems 102 or 130 can instead be included in another of the computing systems 102 or 130. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Example Methods

Figure 5:
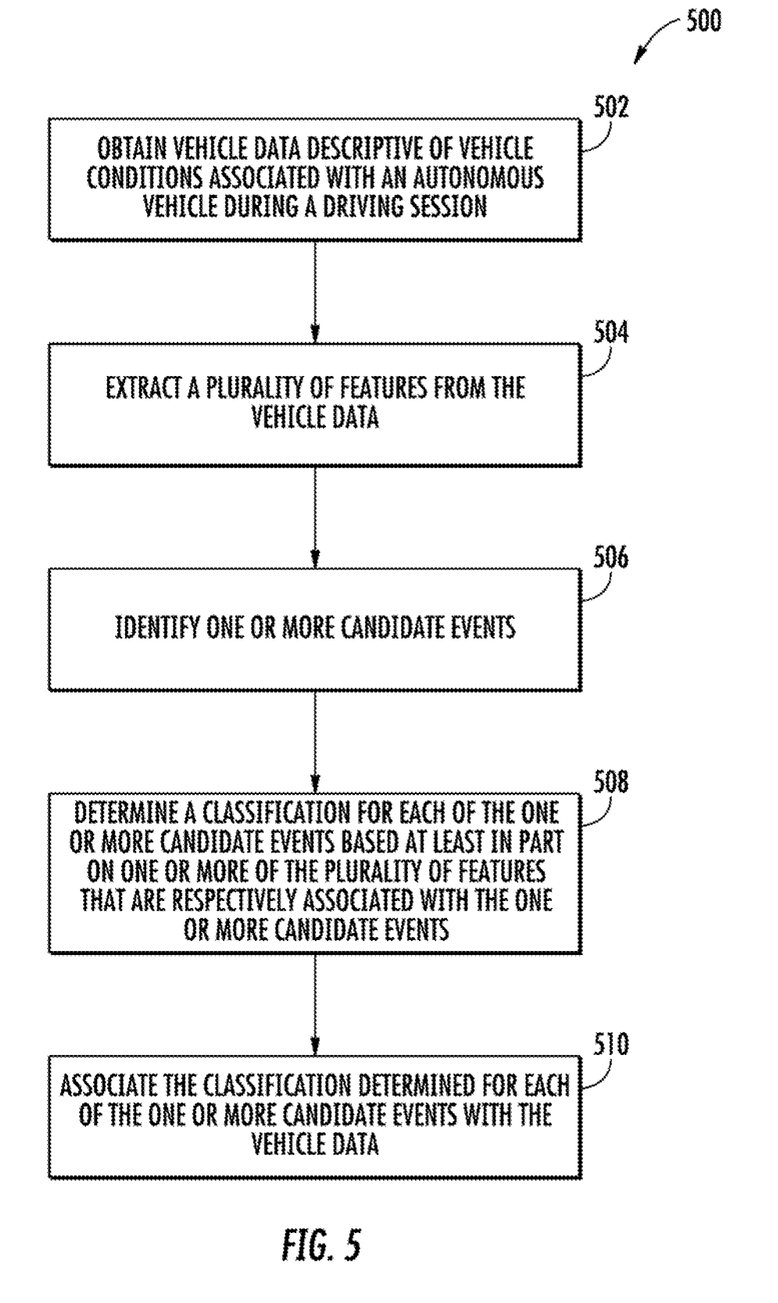
FIG. 5 depicts a flowchart diagram of an example method for event detection and classification according to example embodiments of the present disclosure.

FIG. 5 depicts a flowchart diagram of an example method 500 for event detection and classification according to example embodiments of the present disclosure.

At 502, a computing system obtains vehicle data descriptive of vehicle conditions associated with an autonomous vehicle during a driving session. For example, the vehicle data can be previously obtained vehicle data, currently streaming vehicle data, and/or simulated vehicle data.

At 504, the computing system extracts a plurality of features from the vehicle data. As examples, the plurality of features can include one or more of: a speed feature, a steering angle feature, and a lateral acceleration feature.

In some implementations, extracting the plurality of features at 504 can include performing a continuous wavelet transform on the vehicle data to extract the plurality of features. For example, the continuous wavelet transform can be performed with a Mexican Hat wavelet.

In some implementations, extracting the plurality of features at 504 can include determining a plurality of scale components for each of one or more vehicle data channels and computing, for each of the one or more vehicle data channels, a set of statistics that describe the plurality of scale components for such vehicle data channel.

In some implementations, computing the set of statistics for a vehicle data channel can include computing, for each of the plurality of features, one or more of: a mean of the plurality of scale components, a standard deviation of the plurality of scale components, a maximum of the plurality of scale components, a minimum of the plurality of scale components, and a moment of the plurality of scale components.

At 506, the computing system identifies one or more candidate events. In some implementations, identifying one or more candidate events at 506 can include identifying one or more relative peaks associated with a plurality of scale components, where each of the one or more relative peaks corresponds to one of the one or more candidate events.

At 508, the computing system determines a classification for each of the one or more candidate events based at least in part on one or more of the plurality of features that are respectively associated with the one or more candidate events. As examples, determining the classification at 508 can include assigning at least one of the candidate events to one or more of the following classifications: a high deceleration classification, a high acceleration classification, a juke classification, a jerk classification, and a weaving classification.

In some implementations, at 508, the computing system can use a machine-learned classifier to determine the classification for each of the one or more candidate events. For example, the computing system can input the plurality of features for each candidate event into the classifier and receive the classification for each candidate event as an output of the classifier. As examples, the classifier can include one or more of a logistic regression classifier, a support vector machine, and a neural network.

In some implementations, the machine-learned classifier can have been trained based at least in part on training data that comprises vehicle data logs that were previously collected during previous autonomous vehicle driving sessions, each of the vehicle data logs annotated with event labels that were provided by human passengers during the corresponding previous autonomous vehicle driving session.

At 510, the computing system associates the classification determined for each of the one or more candidate events with the vehicle data. For example, the classification can be annotated to the vehicle data. In some implementations, the classification can be used for scoring and/or triaging purposes.

Figure 6:
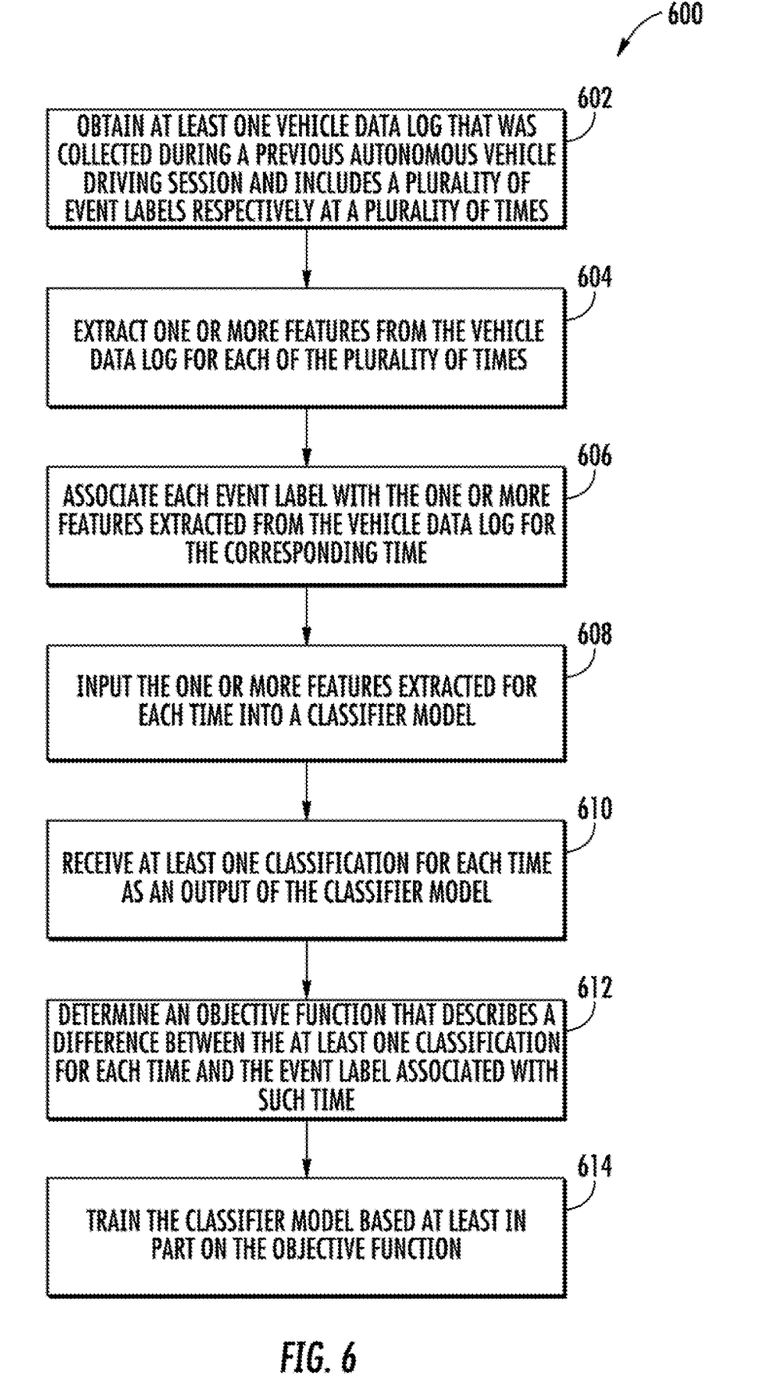
FIG. 6 depicts a flowchart diagram of an example method for training a classifier model according to example embodiments of the present disclosure.

FIG. 6 depicts a flowchart diagram of an example method 600 for training a classifier model according to example embodiments of the present disclosure.

At 602, a computing system obtains at least one vehicle data log that was collected during a previous autonomous vehicle driving session and includes a plurality of event labels respectively at a plurality of times. For example, the vehicle data log can be descriptive of vehicle conditions associated with an autonomous vehicle during the previous autonomous vehicle driving session. The plurality of event labels can have been provided by a human passenger of the autonomous vehicle during the corresponding previous autonomous vehicle driving session.

At 604, the computing system extracts one or more features from the vehicle data log for each of the plurality of times. As examples, the plurality of features can include one or more of: a speed feature, a steering angle feature, and a lateral acceleration feature.

In some implementations, prior to extracting the plurality of features at 604, the computing system can identify a plurality of potentially referenced events within a time window prior to the particular time associated with the event label. The computing system can associate the event label with each of the plurality of potentially referenced events. The plurality of features can be extracted for each time associated with any event label, including newly associated event labels.

In some implementations, extracting the plurality of features at 604 can include performing a continuous wavelet transform on the vehicle data to extract the plurality of features. For example, the continuous wavelet transform can be performed with a Mexican Hat wavelet.

In some implementations, extracting the plurality of features at 604 can include determining a plurality of scale components for each of one or more vehicle data channels and computing, for each of the one or more vehicle data channels, a set of statistics that describe the plurality of scale components for such vehicle data channel.

In some implementations, computing the set of statistics for a vehicle data channel can include computing, for each of the plurality of features, one or more of: a mean of the plurality of scale components, a standard deviation of the plurality of scale components, a maximum of the plurality of scale components, a minimum of the plurality of scale components, and a moment of the plurality of scale components.

At 606, the computing system associates each event label with the one or more features extracted from the vehicle data log for the corresponding time. For example, each event label can be annotated to or otherwise logically associated with the corresponding features.

At 608, the computing system inputs the one or more features extracted for each time into a classifier model. As examples, the classifier model can include one or more of a logistic regression classifier, a support vector machine, and a neural network.

At 610, the computing system receives at least one classification for each time as an output of the classifier model. As examples, the at least one classification can include one or more of the following classifications: a high deceleration classification, a high acceleration classification, a juke classification, a jerk classification, and a weaving classification.

At 612, the computing system determines an objective function that describes a difference between the at least one classification for each time and the event label associated with such time. At 614, the computing system trains the classifier model based at least in part on the objective function. For example, the computing system can backpropagate the objective function through the classifier model to train the classifier model.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

In particular, although FIGS. 5 and 6 respectively depict steps performed in a particular order for purposes of illustration and discussion, the methods of the present disclosure are not limited to the particularly illustrated order or arrangement. The various steps of the methods 500 and 600 can be omitted, rearranged, combined, and/or adapted in various ways without deviating from the scope of the present disclosure.

What is claimed is:

1. A computer-implemented method to detect uncomfortable driving events performed by autonomous vehicles, the method comprising:

obtaining, by one or more computing devices, training data that comprises vehicle data logs that were previously collected during previous autonomous vehicle driving sessions, each of the vehicle data logs annotated with event labels that were provided by human passengers during one of the previous autonomous vehicle driving sessions, each event label having a respective label time associated therewith;

analyzing, by the one or more computing devices, each vehicle data log to identify one or more potentially referenced events for each event label, wherein each of the one or more potentially referenced events identified for each event label has an associated event time that is included in a time window prior to the respective label time associated with such event label;

assigning, by the one or more computing devices, each event label to at least one of the one or more potentially referenced events identified for such event label, such that the event label is associated with vehicle data collected at the respective event time which is prior to the respective label time;

after assigning the event labels to the potentially referenced events, training, by the one or more computing devices, a machine-learned classifier using the training data comprising the event labels assigned to the potentially referenced events at the respective event times; and after training the machine-learned classifier:

obtaining, by the one or more computing devices, vehicle data descriptive of vehicle conditions associated with an autonomous vehicle during an autonomous driving session;

extracting, by the one or more computing devices, a plurality of features from the vehicle data;

determining, by the one or more computing devices using the machine-learned classifier, a classification for each of one or more candidate events based at least in part on one or more of the plurality of features that are respectively associated with the one or more candidate events; and associating, by the one or more computing devices, the classification determined for each of the one or more candidate events with the vehicle data.

2. The computer-implemented method of claim 1, wherein extracting, by the one or more computing devices, the plurality of features from the vehicle data comprises performing, by the one or more computing devices, a continuous wavelet transform on the vehicle data to extract the plurality of features.

3. The computer-implemented method of claim 2, wherein performing, by the one or more computing devices, the continuous wavelet transform comprises performing, by the one or more computing devices, the continuous wavelet transform on the vehicle data with a Mexican Hat wavelet to extract the plurality of features.

4. The computer-implemented method of claim 1, wherein the plurality of features comprise one or more of: a speed feature, a steering angle feature, and a lateral acceleration feature.

5. The computer-implemented method of claim 1, wherein extracting, by the one or more computing devices, the plurality of features from the vehicle data comprises:
    determining, by the one or more computing devices, a plurality of scale components for each of one or more vehicle data channels; and
    computing, by the one or more computing devices for each of the one or more vehicle data channels, a set of statistics that describe the plurality of scale components for such vehicle data channel.

6. The computer-implemented method of claim 5, wherein computing, by the one or more computing devices for each of the one or more vehicle data channels, the set of statistics that describe the plurality of scale components for such vehicle data channel comprises computing, by the one or more computing devices for each of the plurality of features, one or more of: a mean of the plurality of scale components, a standard deviation of the plurality of scale components, a maximum of the plurality of scale components, a minimum of the plurality of scale components, and a moment of the plurality of scale components.

7. The computer-implemented method of claim 1, wherein:
    extracting, by the one or more computing devices, the plurality of features comprises determining, by the one or more computing devices, a plurality of scale components; and
    the method further comprises identifying, by the one or more computing devices, one or more relative peaks associated with the plurality of scale components, each of the one or more relative peaks corresponding to one of the one or more candidate events.

8. The computer-implemented method of claim 1, wherein determining, by the one or more computing devices using a machine-learned classifier, the classification for each of the one or more candidate events comprises assigning, by the one or more computing devices, at least one of the candidate events to one or more of the following classifications: a high deceleration classification, a high acceleration classification, a juke classification, a jerk classification, and a weaving classification.

9. The computer-implemented method of claim 1, wherein determining, by the one or more computing devices using the machine-learned classifier, the classification for each of the one or more candidate events comprises, for each candidate event:
    inputting, by the one or more computing devices, the one or more features associated with the candidate event into the machine-learned classifier, wherein the machine-learned classifier comprises one or more of a logistic regression classifier, a support vector machine, and a neural network; and
    receiving, by the one or more computing devices, the classification for the candidate event as an output of the machine-learned classifier.

10. The computer-implemented method of claim 1, wherein the one or more computing devices are on-board the autonomous vehicle and the method is iteratively performed in real-time as the autonomous vehicle operates to execute the autonomous driving session.

11. A computer system, comprising:
    one or more processors; and
    one or more tangible, non-transitory, computer readable media that collectively store:
        at least one vehicle data log that was collected during a previous autonomous vehicle driving session, the vehicle data log descriptive of vehicle conditions associated with an autonomous vehicle during the previous autonomous vehicle driving session, the vehicle data log annotated with a plurality of event labels respectively at a plurality of label times; and
        instructions that, when executed by the one or more processors, cause the computer system to:
            analyze the vehicle data log to identify one or more potentially referenced events for each event label, wherein each of the one or more potentially referenced events identified for each event label has an associated event time that is included in a time window prior to the respective label time associated with such event label;
            assign each event label to at least one of the one or more potentially referenced events identified for such event label;
            extract, for the event time associated with each potentially referenced event to which one of the event labels has been assigned, one or more features from the vehicle data log;
            associate each event label with the one or more features extracted from the vehicle data log for the event time associated with each potentially referenced event to which one of the event labels has been assigned, such that the event label is associated with features extracted from the vehicle data log collected at the respective event time which is prior to the respective label time; and
            train a classifier model to perform event classification based at least in part on the plurality of event labels and the one or more features respectively associated therewith.

12. The computer system of claim 11, wherein the classifier model comprises one or more of a logistic regression classifier, a support vector machine, and a neural network.

13. The computer system of claim 11, wherein to train the classifier model to perform event classification based at least in part on the plurality of event labels and the one or more features respectively associated therewith, the instructions further cause the computer system to:
    input, for each of the plurality of times, the one or more features extracted for such time into the classifier model;
    receive, for each of the plurality of times, at least one classification as an output of the classifier model;
    determine, for each of the plurality of times, an objective function that describes a difference between the at least one classification for such time and the event label associated with such time; and train the classifier model based at least in part on the objective function.

14. The computer system of claim 11, wherein to extract, for the event time associated with each potentially referenced event to which one of the event labels has been assigned, the one or more features from the vehicle data log the instructions further cause the computer system to perform, for the event time associated with each potentially referenced event to which one of the event labels has been assigned, a continuous wavelet transform on the vehicle data log to extract the one or more features.

15. The computer system of claim 11, wherein to extract, for the event time associated with each potentially referenced event to which one of the event labels has been assigned, the one or more features from the vehicle data log the instructions further cause the computer system to:

determine, for the event time associated with each potentially referenced event to which one of the event labels has been assigned, a plurality of scale components for each of one or more vehicle data channels; and compute, for the event time associated with each potentially referenced event to which one of the event labels has been assigned and for each of the one or more vehicle data channels, a set of statistics that describe the plurality of scale components for such vehicle data channel at such time.

16. A computer system, comprising:

one or more processors;

a machine-learned classifier model; and one or more tangible, non-transitory, computer-readable media that store instructions that, when executed by the one or more processors, cause the one or more processors to perform operations, the operations comprising:

obtaining training data that comprises vehicle data logs that were previously collected during previous autonomous vehicle driving sessions, each of the vehicle data logs annotated with event labels that were provided by human passengers during one of the previous autonomous vehicle driving sessions, each event label having a respective label time associated therewith;

analyzing each vehicle data log to identify one or more potentially referenced events for each event label, wherein each of the one or more potentially referenced events identified for each event label has an associated event time that is included in a time window prior to the respective label time associated with such event label;

assigning each event label to at least one of the one or more potentially referenced events identified for such event label such that the event label is associated with vehicle data collected at the respective event time which is prior to the respective label time;

after assigning the event labels to the potentially referenced events, training a machine-learned classifier using the training data comprising the event labels assigned to the potentially referenced events at the respective event times; and after training the machine-learned classifier:

obtaining vehicle data descriptive of vehicle conditions associated with an autonomous vehicle during a driving session;

extracting a plurality of features from the vehicle data;

identifying a plurality of candidate events;

inputting, for each of the plurality of candidate events, the plurality of features into the machine-learned classifier model;

receiving, for each of the plurality of candidate events, a classification for the candidate event as an output of the machine-learned classifier model; and associating the classification provided for each of the plurality of candidate events with the vehicle data.

17. The computer system of claim 16, wherein:

extracting the plurality of features from the vehicle data comprises performing a continuous wavelet transform on the vehicle data to extract the plurality of features.

* * * * *